United States Patent
Andonian et al.

(10) Patent No.: US 6,776,252 B1
(45) Date of Patent: Aug. 17, 2004

(54) STEER-BY-WIRE SYSTEM AND METHOD FOR ACTUATING ROAD WHEELS OF A VEHICLE

(75) Inventors: Brian J. Andonian, Plymouth, MI (US); Bing Zheng, Dublin, OH (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/350,576

(22) Filed: Jan. 24, 2003

(51) Int. Cl.[7] .................................. B60D 5/04
(52) U.S. Cl. ........................ 180/402; 180/422
(58) Field of Search ...................... 180/402, 403, 180/411–413, 421, 422; 701/41, 42

(56) References Cited

U.S. PATENT DOCUMENTS

| | | | |
|---|---|---|---|
| 4,741,409 A | 5/1988 | Westercamp et al. | |
| 4,869,334 A | 9/1989 | Marumoto et al. | |
| 5,247,441 A | 9/1993 | Serizawa et al. | |
| 5,828,972 A | 10/1998 | Asanuma et al. | |
| 6,176,341 B1 * | 1/2001 | Ansari | 180/402 |
| 6,208,923 B1 | 3/2001 | Hommel | |
| 6,219,604 B1 | 4/2001 | Dilger et al. | |
| 6,345,681 B1 | 2/2002 | Hackl et al. | |
| 6,394,218 B1 | 5/2002 | Heiter | |
| 6,442,462 B1 | 8/2002 | Nishizaki et al. | |
| 6,523,637 B1 * | 2/2003 | Nakano et al. | 180/402 |
| 6,548,969 B2 * | 4/2003 | Ewbank et al. | 318/34 |
| 6,622,813 B2 * | 9/2003 | Matz et al. | 180/411 |
| 2002/0059021 A1 | 5/2002 | Nishizaki et al. | |

* cited by examiner

*Primary Examiner*—Lesley D. Morris
*Assistant Examiner*—L. Lum
(74) *Attorney, Agent, or Firm*—Brinks Hofer Gilson & Lione

(57) ABSTRACT

The present invention involves a steer-by-wire actuating system and method of actuating road wheels of a vehicle with the steer-by-wire actuating system. The system includes a steering linkage assembly including an input shaft, an output shaft, and a gear unit linking the input shaft and the output shaft for linear movement of the output shaft to rotate the road wheels of the vehicle. The system further comprises a microcontroller for controlling an actuation strategy including normal and fault detection modes. The microcontroller is configured to receive a steering signal indicative of steering input at a steering interface. The system further includes first and second power electronic drivers in electrical communication with the microcontroller for electric power supply. The system further includes a first motor and a second motor for simultaneous operation with the steer-by-wire steering device. The first motor is in electrical communication with the first power electronic driver to receive electric power therefrom and the second motor is in electrical communication with the second power electronic driver to receive electric power therefrom. The first and second motors are connected to the input shaft for movement thereof to rotate the road wheels based on the steering signal. The first and second motors are configured to cooperate simultaneously to rotate the road wheels during the normal mode.

31 Claims, 1 Drawing Sheet

STEER-BY-WIRE SYSTEM AND METHOD FOR ACTUATING ROAD WHEELS OF A VEHICLE

BACKGROUND OF THE INVENTION

The present invention relates to a steer-by-wire system and method for actuating road wheels of a vehicle.

Vehicle steer-by-wire systems are widely known. A typical steer-by-wire system may include a driver interface, e.g., a steering wheel or a steering joy stick, which is electrically linked to the road wheels of the vehicle. In some steer-by-wire systems, steering inputs at the driver interface are electronically transmitted to an actuating device connected to steering linkages to rotate the road wheels. For example, a steering input from the driver interface may be transmitted by wire to an electronic control unit or a microcontroller which then sends by wire a positioning command to a motor producing steering movement to a steering linkage of the vehicle, e.g., a front axle steering linkage to rotate the road wheels.

Although many current steer-by-wire systems are adequate, improvements may be made on such systems. Failure of steer-by-wire actuators or motors is one concern. Manufacturers have responded to such concern by providing steer-by-wire systems with strategies and control systems in an event of a device failure or system failure. Manufacturers have configured steer-by-wire systems with backup systems, redundancies, hydraulic systems, and/or backup power supplies. However, such added devices and systems require relatively large volume density and relatively high costs.

It has been determined that an increase in electric power capacity of a motor, requires an exponential increase in volume density of the motor. Thus, manufacturers have been challenged in providing a steer-by-wire system having an improved fail-safe system which reduces typical volume density requirements and maintains low costs.

BRIEF SUMMARY OF THE INVENTION

Thus, it is an aspect of the present invention to provide a steer-by-wire system and method for actuating a steering linkage assembly connected to road wheels of a vehicle. The system has fail-safe capabilities for device and system failures.

It is another aspect of the present invention to provide a steer-by-wire system and method for actuating a steering linkage assembly connected to road wheels of a vehicle. The system has units of operation requiring relatively reduced volume density.

In one embodiment, the present invention is a steer-by-wire system for actuating a steering linkage assembly connected to road wheels of a vehicle. The system comprises the steering linkage assembly which includes an input shaft electrically connected to a driver interface, an output shaft connected to road wheels of the vehicle, and a gear unit linking the input and output shafts to rotate the road wheels.

The system further comprises a microcontroller for controlling an actuation strategy including normal and fault detection modes. The microcontroller is in electrical communication with a driver interface, e.g., a steering wheel. The microcontroller is configured to receive a steering signal indicative of steering input at the driver interface. The system further includes first and second power electronic drivers in electrical communication with the microcontroller for electrical power supply. The system further includes a first motor and a second motor for simultaneous operation with the steer-by-wire steering device. The first motor is in electrical communication with the first power electronic driver to receive electric power therefrom and the second motor is in electrical communication with the second power electronic driver to receive electric power therefrom. The first and second motors are connected to the input shaft to move the input shaft for linear movement of the output shaft to rotate the road wheels based on the steering signal. The first and second motors are configured to cooperate simultaneously to rotate the road wheels during the normal mode.

Further aspects, features and advantages of the invention will become apparent from consideration of the following description and the appended claims when taken in connection with the accompanying drawings.

DETAILED DESCRIPTION OF THE INVENTION

The present invention generally provides a steer-by-wire system and method for actuating a steering linkage assembly of a vehicle. A plurality of actuating devices in parallel, e.g., two motors, are simultaneously implemented on an input shaft of a steering linkage assembly of the vehicle for linear movement of an output shaft connected to road wheels of the vehicle based on driver inputs at a driver interface, the linear movement of the output shaft rotates the road wheels. The simultaneous operation of the actuating devices call for reduced power and weight requirements, saving volume density and costs. The plurality of actuating devices allow for an improved fail-safe and space saving steer-by-wire actuating system having relatively reduced volume density and weight requirements.

Figure 1:
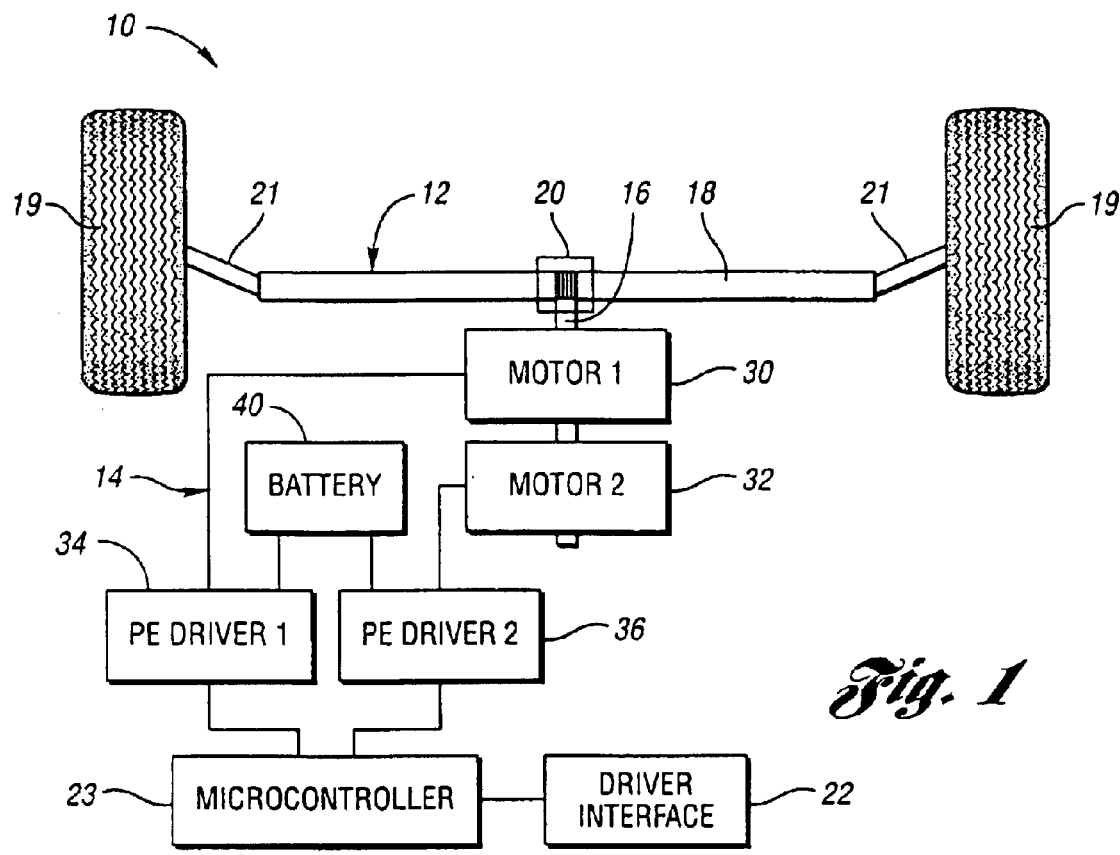
FIG. 1 is a schematic view of part of a vehicle having a steer-by-wire actuating system in accordance with one embodiment of the present invention.

FIG. 1 illustrates a vehicle 10 having a steer-by-wire actuating system for actuating a steering linkage assembly to turn road wheels of the vehicle. As shown, vehicle 10 includes a steering linkage assembly 12 and a steer-by-wire actuating system 14 which is configured to actuate steering linkage assembly 12 to rotate road wheels of the vehicle. Steering linkage assembly 12 includes an input shaft 16, an output shaft 18 which is connected to road wheels 19 of the vehicle 10 by tie rods 21, and a gear unit 20 linking input shaft 16 and output shaft 18. As shown, gear unit 20 links the input shaft 16 and the output shaft 18, wherein rotation of input shaft 16 results in linear movement of the output shaft to turn the road wheels 19.

In this embodiment, steering linkage assembly 12 may be a conventional rack-and-pinion steering assembly or a recirculating ball worm and nut steering gear. However, it is to be noted that any other steering linkage assembly having an input may be used without falling beyond the scope or spirit of the present invention.

FIG. 1 further illustrates a microcontroller 23 in electrical communication with a driver interface 22 for controlling an actuation strategy. In this embodiment, the actuating strategy includes normal and fault modes of the steer-by-wire system 14. The microcontroller 23 is configured to receive a steering signal indicative of a steering input at the driver interface for rotating the road wheels consistent with the steering input based on a predetermined steering ratio of the vehicle. The microcontroller may be any suitable unit having a microprocessor to control the units of the steer-by-wire system. The microcontroller may be a plurality of units having a separate microprocessor for each driver and motor, without falling beyond the scope or spirit of the present invention.

The steer-by-wire system 14 further includes a first power electronic driver 34 and a second power electronic driver 36 in electrical communication with the microcontroller 23 for power to move the steering linkage assembly for rotation of the road wheels. As shown, system 14 further includes a first motor 30 and a second motor 32 for simultaneous operation with the steering linkage assembly 12. The first motor 30 is in electrical communication with the first power electric driver 34 to receive electric power therefrom and the second motor 32 is in electrical communication with the second power electronic driver 36 to receive electric power therefrom.

The first and second motors 30, 32 are connected to the input shaft 16 for movement thereof to rotate the road wheels 19 based on the steering signal and a predetermined steering ratio of the vehicle. The first and second motors 30, 32 are configured to cooperate simultaneously to rotate the road wheels 19 during the normal mode. The first and second power electronic drivers 34, 36 may be power supplied by different or the same sources. In this embodiment, drivers 34, 36 are supplied by one source, battery 40.

In this embodiment, the first motor 30 applies a first torque on the input shaft 16 and the second motor applies a second torque on the input shaft 16 simultaneously. The first torque is proportional to a first power generated by the first power electronic driver 34 to the first motor 30. The second torque is proportional to a second power generated by the second power electronic driver 36 to the second motor 32. The first power and the second power are both a percentage of a required power for motors 30, 32 to rotate the road wheels 19 during the normal mode. The first and second motors 30, 32 simultaneously operate to provide a combined power equal to the required power to rotate the wheels. In this embodiment, each of the first power and the second power is approximately 50% of the required power for the motors to actuate the steering linkage assembly for rotation of the road wheels during the normal mode.

In this embodiment, the actuation strategy may be configured in the microcontroller 23 in any suitable way known in the art. Additional units, e.g., sensors, (not shown) may be implemented to transmit steering wheel angle signals and road wheel signals to the microcontroller during normal and fault modes. In this embodiment, the normal mode indicates an operating status of the steer-by-wire actuating system 14 having no fault. In the normal mode, the first and second motors 30, 32 operate simultaneously.

In this embodiment, the fault mode indicates an operating status of the steer-by-wire actuating system having a fault. The fault mode may indicate failure of any unit of the system 14 mentioned above including one of the first and second motors. Moreover, in the fault mode, one of the first and second motors 30, 32 operate independently based on which unit has failed or where the failure has occurred. For example, if the first power electronic driver 34 fails, then the second power electronic driver 36 and second motor 32 will operate independently to actuate the steering linkage assembly. That is, one of the first and second motors independently operates the steer-by-wire actuating system to move the steering linkage assembly for rotation of the road wheels during the fault mode. The microcontroller may be configured in any suitable manner or with any suitable strategy to determine the mode in which to operate the steer-by-wire system.

Thus, during the normal mode, the first and second motors operate simultaneously to apply torque to the input shaft so that the output shaft linearly moves to rotate the road wheels based on a predetermined steering ratio of the vehicle. In this embodiment, each of the first and second motors operates at a capacity of 50% of the required power or torque applied on the input shaft to rotate the road wheels at the predetermined steering ratio. As it is known, at lower vehicle speeds, e.g., 0–10 miles per hour, power and torque requirements on the input shaft are relatively greater than higher vehicle speeds, e.g., greater than 10 miles per hour, to rotate the road wheels based on the predetermined steering ratio. It has been determined that the required power to rotate the road wheels is provided by a power requirement at 0 miles per hour.

In this embodiment, volume density of each motor is determined and provided by configuring each of the first and second motors to a power requirement and torque capacity of 50% of the required power and torque to rotate the road wheels when the vehicle is at 0 miles per hour. Since the present invention includes at least two motors operating at 50% of the required power and torque, the volume density of each motor is reduced relative to the size of one motor at 100% of the requirements.

Figure 2:
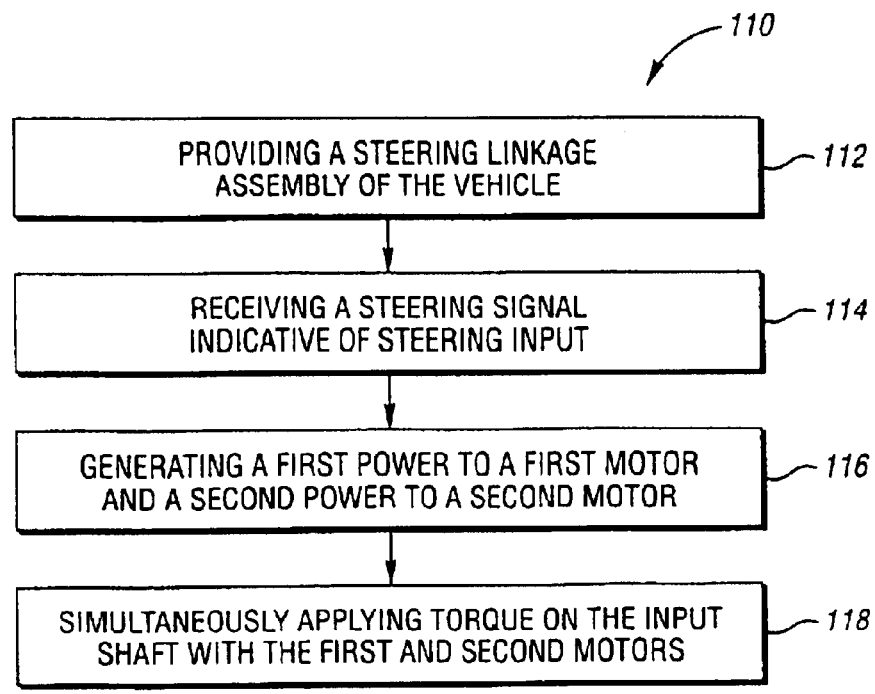
FIG. 2 is a flow chart of a method of actuating a steering linkage assembly of the vehicle having the steer-by-wire system of FIG. 1 in accordance with one embodiment of the present invention.

FIG. 2 depicts a method 110 of actuating a steering linkage assembly of a vehicle implemented by the steer-by-wire actuating system mentioned above. In this embodiment, the assembly and system mentioned above are provided in box 112. In this embodiment, the microcontroller receives a steering signal indicative of steering input at the driver interface based on a predetermined steering ratio of the vehicle in box 114. The microcontroller processes the steering signal and transmits first and second command signals to the first and second power electronic drivers, respectively.

In this embodiment, the first power electronic driver generates a first power to the first motor and the second power electronic driver generates a second power to the second motor based on the first and second command signals, respectively, in box 116. Then, the first and second motors simultaneously apply a first torque and a second torque, respectively, on the input shaft to rotate the road wheels in box 118. As mentioned above, each of the first power and the second power is a percentage of a required power to rotate the road wheels during the normal mode.

In an event in which one of the motors or power drivers fail, the other respective motor or driver may continue to operate at its configured capacity. Operation of the other respective driver and motor allows the vehicle operator to maneuver the vehicle to the service facility for trouble shooting or repair.

Further aspects, features and advantages of the invention will become apparent from consideration of the following erudite description and the appended claims when taken in connection with the accompanying drawings.

What is claimed is:

1. A steer-by-wire actuating system for actuating a first road wheel and a second road wheel of a vehicle, the system comprising:
   a microcontroller for controlling an actuation strategy including normal and fault modes of the steer-by-wire system, the microcontroller being configured to receive a steering signal indicative of steering input at a driver interface;

first and second power electronic drivers in electrical communication with the microcontroller for electric power; and a first motor coupled with the first and second road wheels and a second motor coupled with the fist and second road wheels, the first motor being in electrical communication with the first power electronic driver to receive electric power therefrom, the second motor being in electrical communication with the second power electronic driver to receive electric power therefrom, the first and second motors configured to cooperate simultaneously to rotate the first road wheel during the normal mode, and the first and second motors configured to cooperate simultaneously to rotate the second road wheel during normal mode.

2. The system of claim 1 wherein the first motor provides a first power and the second motor provides a second power, each of the first and second powers being a percentage of a required power to rotate the first and second road wheels during the normal mode, the first and second motors simultaneously operating to provide a combined power greater than a required power to rotate the first and second road wheels.

3. The system of claim 2 wherein a percentage of power applied from each of the first and second motors is at least 50% of the required power to rotate the first and second road wheels during the normal mode.

4. The system of claim 1 wherein the normal mode indicates a no fault operating status of the steer-by-wire system.

5. The system of claim 4 wherein the fault mode indicates a fault operating status of the steer-by-wire system.

6. The system of claim 5 wherein the fault mode includes failure of one of the first motor, the second motor, the first driver, and the second driver.

7. The system of claim 6 wherein one of the first and second motors independently rotates the first road wheel during the fault mode.

8. The system of claim 4 wherein the normal mode includes simultaneous operation of the first and second motors and the fault mode includes independent operation of one of the first and second motors.

9. The system of claim 1 further including a rack-and-pinion steering assembly coupled with the first and second motors and configured to rotate the first and second road wheels.

10. The system of claim 1 further including a recirculating ball worm and nut steering gear assembly coupled with the first and second motors and configured to rotate the first and second road wheels.

11. The system of claim 1 wherein the output shaft includes first and second ends, each of the ends being linked to a tie rod, each of the rods being attached to a road wheel.

12. The system of claim 1 further comprising a power supply in electrical communication with at microcontroller and the first and second power electronic drives for supplying power to the first and second power electronic drivers.

13. A method of rotating road wheels of a vehicle with a steer-by wire system, the method comprising:

providing a steering linkage assembly including an input shaft electrically connected to a driver interface of the vehicle, an output shaft connected to road wheels of the vehicle, a gear unit linking the input and output shafts for linear movement of the output shaft to rotate the road wheels, and a first motor and a second motor for simultaneous operation with the steer-by-wire system having an actuating strategy including normal and fault detection modes;

receiving a steering signal indicative of steering input at the driver interface based on a predetermined steering ratio of the vehicle;

generating a first power to the first motor and a second power to the second motor based on the steering signal; and simultaneously applying torque on the input shaft with the first and second motors to rotate the road wheels based on he steering signal and the first and second powers, each of the first power and the second power being a percentage of a required power to rotate the road wheels during the normal mode, wherein one of the first and second motors independently operates the steer-by-wire steering device to rotate the wheels during the fault mode.

14. The method of claim 13 wherein the normal mode indicates an operating status of the steer-by-wire steering system having no fault.

15. The method of claim 14 wherein the fault detection mode indicates an operating status of the steer-by-wire system having a fault.

16. The system of claim 15 wherein the fault mode includes failure of one of the first and second motors.

17. The method of claim 14 wherein the normal mode includes simultaneous operation of the first and second motors and the fault mode includes independent operation of one of the first and second motors.

18. The method of claim 13 wherein the steering linkage assembly defines a rack-and-pinion steering of the vehicle.

19. The method of claim 13 wherein the percentage of a required power to rotate the road wheels during the normal mode is at least 50%.

20. A steer-by-wire actuating system for actuating road wheels of a vehicle, the system comprising:

a steering linkage assembly including an input shaft electrically connected to a driver interface, an output shaft connected to the road wheels of the vehicle simultaneously rotating the road wheels, and a gear unit linking the input and output shafts for linear movement of the output shaft to rotate the road wheels;

a microcontroller for controlling an actuation strategy including normal and fault modes of the steer-by-wire system, the microcontroller configured to receive a steering signal indicative of steering input at the driver interface;

first and second power electronic drivers in electrical communication with the microcontroller for electric power; and a first motor and a second motor for simultaneous operation with the steering linkage assembly, the first motor being in electrical communication with the first power electronic driver to receive electric power therefrom, the second motor being in electrical communication with the second power electronic driver to receive electric power therefrom, the first and second motors being connected to the input shaft for movement thereof to rotate the road wheels based on the steering signal, the first and second motors configured to cooperate simultaneously to rotate the road wheels during the normal mode.

21. The system of claim 20 wherein the normal mode indicates a no fault operating status of the steer-by-wire system.

22. The system of claim 21 wherein the fault mode indicates a fault operating status of the steer-by-wire system.

23. The system of claim 22 wherein the fault mode includes failure of one of the first motor, the second motor, the first driver, and the second driver.

24. The system of claim 23 wherein one of the first and second motors independently operates the steering linkage assembly to rotate the road wheels during the fault mode.

25. The system of claim 21 wherein the normal mode includes simultaneous operation of the first and second motors and the fault mode includes independent operation of one of the first and second motors.

26. The system of claim 20 wherein the input shaft, the output shaft, and the gear unit define a rack-and-pinion steering assembly of the vehicle.

27. The system of claim 20 wherein the input shaft, the output shaft, and the gear unit represent a recirculating ball worm and nut steering gear assembly.

28. The system of claim 20 wherein the output shaft includes first and second ends, each of the ends being linked to a tie rod, each of the rods being attached to a road wheel.

29. The system of claim 20 further comprising a power supply in electrical communication with the microcontroller and the first and second power electronic drivers for supplying power to the first and second power electronic drivers.

30. The system of claim 20 wherein a percentage of power applied from each of the first and second motors is at least 50% of the required power to rotate the road wheels during the normal mode.

31. A steer-by-wire actuating system for actuating road wheels of a vehicle, the system comprising:

a steering linkage assembly including an input shaft electrically connected to a driver interface, an output shaft connected to the road wheels of the vehicle, and a gear unit linking the input and output shafts for linear movement of the output shaft to rotate the road wheels;

a microcontroller for controlling an actuation strategy including normal and fault modes of the steer-by-wire system, the microcontroller configured to receive a steering signal indicative of steering input at the driver interface;

first and second power electronic drivers in electrical communication with the microcontroller for electric power; and a first motor and a second motor for simultaneous operation with the steering linkage assembly, the first motor being in electrical communication with the first power electronic driver to receive electric power therefrom, the second motor being in electrical communication with the second power electronic driver to receive electric power therefrom, the first and second motors being connected to the input shaft for movement thereof to rotate the road wheels based on the steering signal, the first and second motors configured to cooperate simultaneously to rotate the road wheels during the normal mode;

the first motor providing a first power and the second motor providing a second power, each of the first and second powers being a percentage of a required power to rotate the road wheels during the normal mode, the first and second motors simultaneously operating to provide a combined power greater than the required power to rotate the road wheels.

* * * * *